(12) United States Patent
Harris et al.

(10) Patent No.: US 8,548,435 B2
(45) Date of Patent: Oct. 1, 2013

(54) PROVIDING ACCESS TO INFORMATION OF MULTIPLE TYPES VIA COORDINATION OF DISTINCT INFORMATION SERVICES

(75) Inventors: Paul Evert Harris, Seattle, WA (US); David Grant Deckert, Redmond, WA (US); Douglas G. Murray, Kirkland, WA (US); Thomas W. Denny, Beaverton, OR (US)

(73) Assignee: Open Text S.A., Grand Duchy of Luxembourg (LU)

( * ) Notice: Subject to any disclaimer, the term of this patent is extended or adjusted under 35 U.S.C. 154(b) by 305 days.

(21) Appl. No.: 13/113,536

(22) Filed: May 23, 2011

(65) Prior Publication Data

US 2011/0286392 A1    Nov. 24, 2011

Related U.S. Application Data

(63) Continuation of application No. 12/342,055, filed on Dec. 22, 2008, now Pat. No. 7,966,002, which is a continuation of application No. 11/745,536, filed on May 8, 2007, now Pat. No. 7,493,104, which is a continuation of application No. 10/635,385, filed on Aug. 6, 2003, now Pat. No. 7,233,786.

(60) Provisional application No. 60/401,619, filed on Aug. 6, 2002.

(51) Int. Cl.
*H04M 1/725* (2006.01)
*H04W 4/00* (2009.01)

(52) U.S. Cl.
USPC ............... 455/412.1; 455/412.2; 370/328

(58) Field of Classification Search
USPC ........ 455/412.1, 412.2, 413, 414.1; 370/328, 370/338, 270, 352; 709/206, 246; 379/67.1, 379/88.11, 88.12
See application file for complete search history.

(56) References Cited

U.S. PATENT DOCUMENTS

| 6,466,909 B1 | 10/2002 | Didcock |
| 6,477,494 B2 | 11/2002 | Hyde-Thomson et al. |
| 6,487,533 B2 | 11/2002 | Hyde-Thomson et al. |
| 6,549,612 B2 * | 4/2003 | Gifford et al. ............... 379/67.1 |

(Continued)

OTHER PUBLICATIONS

IBM Corporation, "WebSphere Everyplace Access," 5 pages, http://www-3.ibm.com/pvc/products/mobile_apps/ws_everyplace_access.shtml [accessed Aug. 2, 2002].

(Continued)

*Primary Examiner* — Sonny Trinh
(74) *Attorney, Agent, or Firm* — Sprinkle IP Law Group

(57) ABSTRACT

Techniques are described for providing users of client devices with coordinated access to information and/or functionality of multiple types, such as by using multiple types of connections to multiple information services of distinct types that exchange context information related to activities of the users and/or clients. The client devices can be, for example, wireless devices with multiple distinct modes (e.g., voice and data modes) for different types of connections with different types of servers (e.g., voice servers and data servers). In some situations, coordination between different servers allows multiple distinct interaction sessions of different types with different servers to remain synchronized or otherwise coordinated over time as the user performs interactions via the different sessions. This abstract is provided to comply with rules requiring an abstract, and is not intended to be used to interpret or limit the scope or meaning of the claims.

20 Claims, 6 Drawing Sheets

(56) References Cited

U.S. PATENT DOCUMENTS

| | | | |
|---|---|---|---|
| 6,603,837 B1 * | 8/2003 | Kesanupalli et al. | 379/88.17 |
| 6,636,587 B1 | 10/2003 | Nagai et al. | |
| 6,745,221 B1 | 6/2004 | Ronca | |
| 6,751,453 B2 * | 6/2004 | Schemers et al. | 455/412.1 |
| 6,788,667 B1 | 9/2004 | Beresin | |
| 6,856,676 B1 | 2/2005 | Pirot et al. | |
| 6,934,756 B2 * | 8/2005 | Maes | 709/227 |
| 7,151,763 B2 | 12/2006 | Koch et al. | |
| 7,233,786 B1 | 6/2007 | Harris et al. | |
| 7,493,104 B2 | 2/2009 | Harris et al. | |
| 7,966,002 B2 | 6/2011 | Harris et al. | |
| 8,032,536 B2 * | 10/2011 | Wu | 707/749 |
| 8,225,232 B2 * | 7/2012 | Sundararaman et al. | 715/811 |
| 8,428,228 B1 * | 4/2013 | Baxter, Jr. | 379/88.14 |
| 8,433,797 B2 * | 4/2013 | Vendrow et al. | 709/224 |
| 2002/0049817 A1 | 4/2002 | Drory et al. | |
| 2006/0189333 A1 | 8/2006 | Othmer | |
| 2006/0280165 A1 | 12/2006 | Blumenschein et al. | |

OTHER PUBLICATIONS

Bevis, D. et al., "Extending enterprise applications to mobile users," IBM Corporation, Somers, New York, Jul. 2002, 25 pages.

Microsoft Corporation, "Mobile Information Server, Product Overview," 2002, 2 pages, http://www.microsoft.com/miserver/evaluation/overview/default.asp, [accessed Aug. 2, 2002].

Microsoft Corporation, "Mobile Information Server, Features," 2002, 3 pages, http://www.microsoft.com/miserver/evaluation/features/default.asp, [accessed Aug. 2, 2002].

Microsoft Corporation, "Mobile Information Server, Frequently Asked Questions About Microsoft Mobility," 2002, 2 pages, http://www.microsoft.com/miserver/evaluation/overview/faq.asp, [accessed Aug. 2, 2002].

Openwave Systems Inc., "OpenwaveTM Services OST", 2000-2002, 1 page, http://www.openwave.com/products/index.html, [accessed Aug. 2, 2002].

Openwave Systems Inc., "Openwave Messaging Suite," 2000-2002, 1 page, http://www.openwave.com/products/messaging_suite/, [accessed Aug. 2, 2002].

Openwave Systems Inc., "OpenwaveTM Unified Messaging," 2000-2002, 2 pages, http://www.openwave.com/products/messaging_suite/unified_messaging/index.html, [accessed Aug. 2, 2002].

Openwave Systems Inc., "OpenwaveTM Unified Messaging and the Carrier," 2000-2002, 1 page, http://www.openwave.com/products/messaging_suite/unified_messaging/um_carrier.html, [accessed Aug. 2, 2002].

Openwave Systems Inc., "OpenwaveTM Unified Messaging," 2001, Redwood City, California, 2 pages.

ViAir, Inc., "ViAir Applications and Infrastructure," 2001, 1 page, http://www.viair.com/products.htm [accessed Aug. 2, 2002].

ViAir, Inc., "Wirelessinbox," 2001, 1 page, http://www.viair.com/products_WI.htm, [accessed Aug. 2, 2002].

ViAir, Inc., "Wireless Application Manager," 2001, 2 pages, http://www.viair.com/products_WAM.htm, [accessed Aug. 2, 2002].

ViAir, Inc., "What is WirelessInboxTM?" 2002, Seattle, Washington, 5 pages.

ViAir, Inc., Wireless Application ManagerTM, Aug. 2001, Seattle, Washington, 5 pages.

Wireless Knowledge, "Products", 2002, 2 pages, http://www.wirelessknowledge.com/Products/default.asp, [accessed Aug. 2, 2002].

Wireless Knowledge, "Workstyle for Microsoft Exchange," 2002, 2 pages, http://www.wirelessknowledge.com/Products/workstyle_exchange.asp, [accessed Aug. 2, 2002].

Wireless Knowledge, "Workstyle Desktop Edition," 2002, 2 pages, http://www.wirelessknowledge.com/Products/wde.asp, [accessed Aug. 2, 2002].

Wireless Knowledge, "Workstyle® Desktop Edition," 2002, San Diego, California, 2 pages.

Wireless Knowledge, "Product Overview, Mobile Groupware for Microsoft® Exchange and Lotus® DominoTM," 2001, San Diego, California, 8 pages.

Captaris, Inc., "AVT Corp. Announces Availability of Mobile Wireless Product Line and Launches New Company Brand," Business Wire, Apr. 2, 2001, 3 pages. http://www.captaris.com/news/press_release/381.html [accessed Jul. 30, 2002].

Captaris, Inc., "Captaris Announces Pricing and Availability of Mobile Wireless Product Line," Business Wire, May 29, 2001, 2 pages, http://www.captaris.com/news/press_release/408.html, [accessed Jul. 30, 2002].

Captaris, Inc., "Infinite Mobile Delivery 2.5 Expands Productivity," Business Wire, Feb. 12, 2002, 2 pages, http://www.captaris.com/news/press_release/381.html, [accessed Jul. 30, 20021.

Kane, M., "Handspring speeds up Treo software," CNET News.com, Oct. 1, 2002, 1 page http://msn-cnet.com/2100-1040-960288.html?tag=Ih [accessed Oct. 1, 2002].

Office Action for U.S. Appl. No. 11/745,536, mailed May 2, 2008, 6 pages.

Office Action for U.S. Appl. No. 12/342,055, mailed Oct. 13, 2010, 5 pages.

\* cited by examiner

PROVIDING ACCESS TO INFORMATION OF MULTIPLE TYPES VIA COORDINATION OF DISTINCT INFORMATION SERVICES

CROSS-REFERENCE TO RELATED APPLICATIONS

This application is a continuation of U.S. patent application Ser. No. 12/342,055, filed Dec. 22, 2008, now U.S. Pat. No. 7,966,002 now allowed, entitled "Providing Access To Information Of Multiple Types Via Coordination Of Distinct Information Services," which is a continuation of U.S. patent application Ser. No. 11/745,536, filed May 8, 2007, now U.S. Pat. No. 7,493,104, entitled "Providing Access To Information Of Multiple Types Via Coordination Of Distinct Information Services," which is a continuation of U.S. patent application Ser. No. 10/635,385, filed Aug. 6, 2003, now U.S. Pat. No. 7,233,786, entitled "Providing Access To Information Of Multiple Types Via Coordination Of Distinct Information Service," which claims the benefit of provisional U.S. Patent Application No. 60/401,619, filed Aug. 6, 2002 and entitled "Providing Information Access To A Wireless Client, Such As Voice Access To A Unified Messaging System," all of which are hereby incorporated by reference in their entireties.

The following disclosure relates generally to computer-assisted accessing of information, and more particularly to providing coordinated access to information and/or functionality of multiple types by using multiple types of connections to multiple information services of distinct types, such as for a voice-based information server to coordinate with a text-based information server to provide information and functionality to a user of a cellular telephone or other wireless handheld client computing device in a synchronized or otherwise coordinated manner.

BACKGROUND

Allowing computer-based access to stored information can provide a variety of useful functionality to users. For example, unified messaging ("UM") systems typically allow users to access multiple types of stored information (e.g., received emails, voice mails, faxes, etc.) in a uniform manner, such as via a single type of connection (e.g., a voice-based connection from an analog or digital wireless telephone, such as using CDMA, GSM or GPRS), or in limited situations via one of multiple different types of connections (e.g., one or more additional data-based types of connections, such as using TCP/IP or WAP). In addition, some UM systems allow users to perform various functionality related to such accessed information, such as to reply to a message of one type with a response message of another type (e.g., respond to a voice mail with an email, or vice versa).

While computer-assisted accessing of information and related functionality (e.g., accessing of UM information and/or functionality) is typically designed to work well when using a fixed station on an internal network (e.g., a desktop computer attached to a internal LAN or a telephone set connected to a PBX), a variety of problems can arise when accessing such information from computing devices that have less capabilities (e.g., many wireless telephones and wireless handheld computing devices) and/or that are not physically present on the internal network. For example, when a user of a wireless phone has accessed an email message from a data server (e.g., an email server) via its data mode and wishes to reply to the email message, there is typically no convenient text input method to supply a response email. In addition, wireless phones and other wireless computing devices that have such data mode connections typically do not allow audio messages (e.g., voice mail in a UM mailbox) to be retrieved and played through the data-based connection. Similarly, a user of a wireless phone that is connected to a voice server (e.g., a voice messaging system or an Interactive Voice Response system) via its voice mode will not typically be able to engage in text-based or other data-based communications over the voice connection.

Even if standard existing wireless computing devices were able to be configured to provide various types of information access and functionality (e.g., the ability to originate, reply to, and listen to messages stored in email) for UM systems in limited situations, such configurations would require additional hardware beyond that of an enterprise UM system and would not typically provide full UM functionality. Similarly, while some specialized wireless computing devices provide simultaneous voice and data channels (e.g., devices using the i-mode service), such functionality is not available to standard existing wireless computing devices, and the multiple channels typically are independent of each other in terms of the information received.

Accordingly, it would be beneficial to provide users of standard existing client computing devices (e.g., wireless phones) with the ability to access a variety of types of information and functionality in an efficient and coordinated manner, such as to access UM systems and gain full UM functionality without requiring additional specialized hardware. Specific examples of beneficial functionality include providing users with a capability to create a voice reply to an email message displayed on a wireless computing device and providing users with a capability to listen to voice messages stored in a UM mailbox when using wireless data access to the mailbox, although more generally it would be beneficial to provide integration with an enterprise UM system from a wireless computing device in order to make the full feature set of the UM system available. Moreover, coordinated multi-mode access to a wide variety of other types of systems providing information and/or functionality also would provide significant additional benefits.

DETAILED DESCRIPTION

Figure 1:
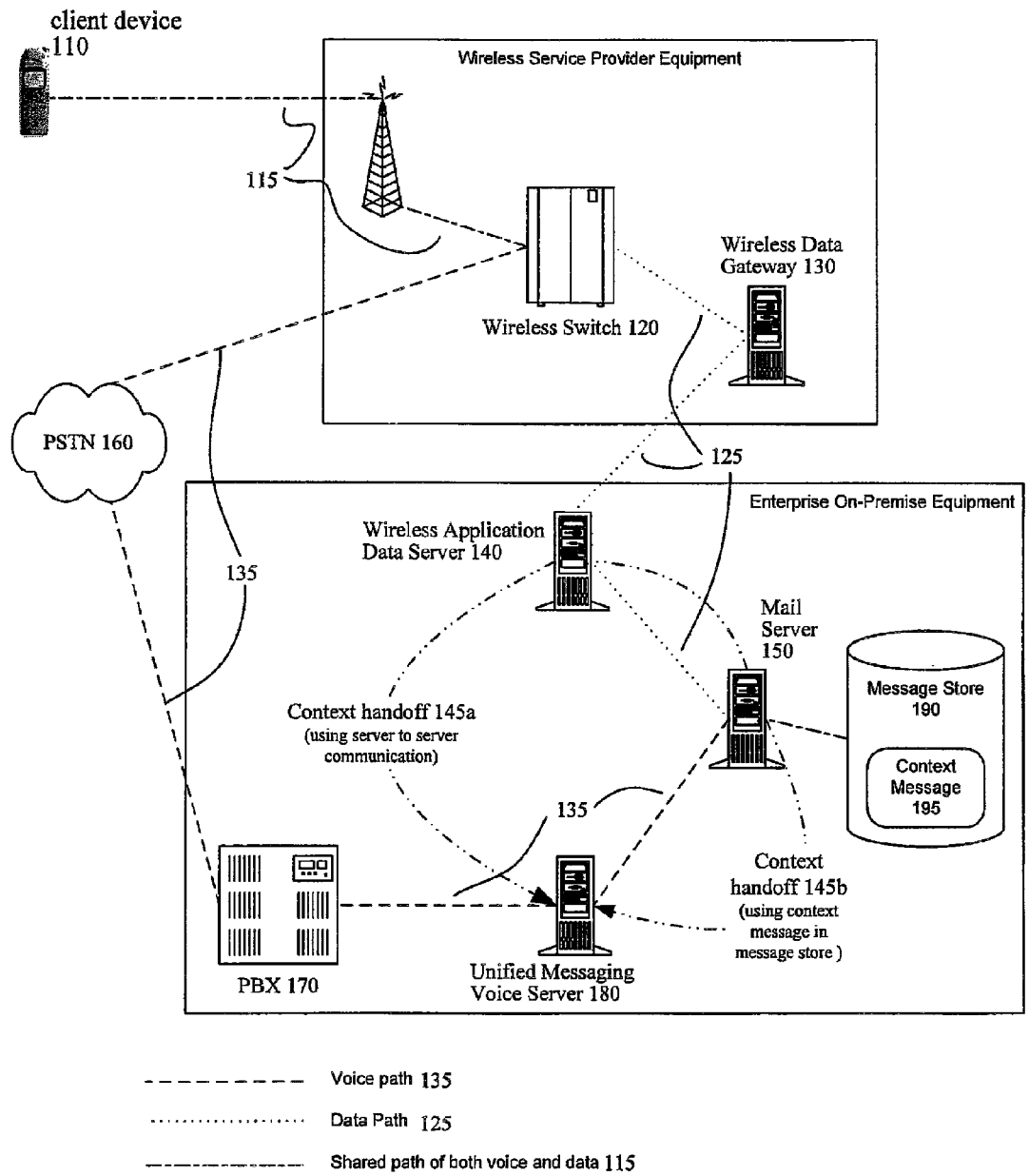
FIG. 1 illustrates an example network diagram in which a standard wireless computing device is accessing the full functionality of a Unified Messaging system using multiple types of connections that are coordinated.

A software facility is described below that provides users of client devices with the ability to receive coordinated access to information and/or functionality of multiple types, such as by using multiple types of connections to multiple information services of distinct types, with the multiple information services coordinating with each other to exchange context information related to activities of the users and/or client devices. In some embodiments, the client devices are wireless devices that support multiple distinct modes (e.g., voice and data modes) that can be used to establish different types of connections (e.g., voice and data connections, such as based on using different types of underlying transmission protocols to exchange different types of data) with different types of servers (e.g., voice servers and data servers). In addition, in some embodiments the multiple servers of different types interact with each other in order to provide context information about interactions of users and/or clients with the servers, such as to allow a user that is accessing information and/or functionality of a first type from a first server to request and receive information or functionality of a second type from a second server, and/or to allow multiple distinct interaction sessions of different types with different servers to remain synchronized or otherwise coordinated over time as the user performs interactions via the different sessions.

As a more specific example, in some embodiments users are provided with the ability to create a voice reply to an email message displayed on a wireless computing device when using a data mode connection of the computing device. For example, users viewing the contents of an email mailbox over a wireless data connection on a cell phone or PDA can select a "voice reply" functionality (e.g., via a menu), and a voice mode connection is automatically made with the enterprise UM system. The user can then record a reply which is sent to the original message sender when the reply is complete. By automatically switching to a voice call, the user is allowed to easily record and send a voice reply to the message. This mechanism also works when a user wants to originate a message to one or more recipients.

In addition, in some embodiments users are provided with the ability to listen to voice messages stored in a UM mailbox when using a data mode connection of a wireless computing device. In a similar manner to the "voice reply" functionality, users may select a voice message to be heard, and a switch to a voice mode connection is automatically made in order to allow the user to hear the voice message over the voice connection. In other embodiments, a user may instead manually initiate or assist a switch in modes, as discussed in greater detail below.

More generally, in some embodiments users interacting with a document (e.g., an email message) or any other type of information that can be provided to a client device over a data mode may further be provided with the ability to access voice-based functionality of any available type that is related to that information, such as by interacting with an Interactive Voice Response ("IVR") system voice server or other voice server that can provide a variety of types of voice-based functionality. For example, a sales person could access his company's CRM (Customer Relationship Management) or ERP (Enterprise Resource Planning) systems (or more generally any database or other source of information) on a wireless client device, select a relevant record or other group of information (e.g., a customer record or a database item) using the wireless data interface, and then use a voice mode of the client device to receive related voice-based functionality, such as recording related voice-based information (e.g., a site visit report to be stored in the CRM system, or other information to be dispatched for dictation and stored as text) and/or receiving a voice rendition of non-voice-based information stored in an underlying database. Alternatively, a user of a client device could obtain using a data mode a text-based indication of information that has an audio representation (e.g., a list of radio or TV news reports, or a list of titles of music selections) and then receive the audio representation of a selected text-based indication using a voice mode of the client device. A variety of other analogous uses and functionalities could similarly be provided, including the following exemplary uses: specifying a reminder or other calendar item using a data mode connection and later receiving a voice-based indication of that item using a voice mode connection; selecting an email message that has an attached audio file using a data mode connection, and having the audio file played over a voice mode connection; and sending voice-based information over a voice mode connection to be recorded by a voice server, and then using a data mode connection to access and manipulate the resulting recorded audio file (e.g., a reporter records an interview on a voice server via a voice mode connection on their cellular phone and subsequently switches to data mode to send the audio file to CNN as an email message).

In some embodiments, other types of data may be provided to client devices in a coordinated manner using the disclosed techniques and/or other types of device modes may be used to receive coordinated access to information and/or functionality, such as to allow interactions with video, images (e.g., photos), graphics, etc. In addition, in some embodiments information and/or functionality may be coordinated between multiple client devices of a single user (e.g., a phone device receiving information via a voice mode and a distinct PDA device or other data-based computing device receiving related information via a data mode, or instead for a user to provide voice-based information to a voice server for storage via a voice mode of a phone and to provide other related information to a data server for storage via a data mode of a distinct data-based computing device, with the voice and data servers coordinating to associate the various stored information for later use) and/or between client devices of multiple related users.

Moreover, the facility will in some embodiments cause the switching between the client device modes connections to occur in an automatic manner, with users in some situations potentially unaware that a new connection has been established or that another existing connection has become the current focus of interaction. Such switching can be performed in a variety of ways, such as by a first server that is interacting with a client device of a user using a first mode sending an instruction to the client device to automatically switch to another mode, by the first server contacting a second server and indicating to the second server to contact a client device of the user using another mode (whether the contacting by the second server is perceptible by the user, such as an incoming voice call, or not), by the client device initiating the switching (e.g., in response to a user request for information or functionality that the user is unaware is based on a mode different than the current mode, or instead based on an independent determination by the client device to switch modes, such as for a scheduled activity or based on a predicted future desire of the user), etc. In other embodiments, the switching may be based at least in part on actions by the user, such as by the first server sending an instruction to the user to perform an action to initiate the switch (e.g., by selecting a link included in a message to the user), or by the user selecting information of a first type and explicitly requesting that information and/or functionality of another type be provided.

In addition, the exchange of context information between the servers removes the need that existed in the prior art for a user that is engaged in interactions with a first server to re-specify information reflecting the current context of the user when establishing a new connection with a second server in order to receive related functionality and/or information. In particular, when control is passed from one mode to another (e.g., from the data session to the voice session), information about the current context is automatically provided to the appropriate systems that are to provide the related information and/or functionality (e.g., the UM system). Thus, when a connection is established between the appropriate user and/or client device and those other system(s), the other system(s) can automatically place the user/client device in the appropriate context to receive the related functionality and/or information. When the new connection with those other systems is established, those other systems can also identify the user and/or client device in a variety of ways to enable the use of the appropriate context information, such as if the system initiated the connection by explicitly contacting a known user or client device, or instead based on information provided by the user and/or client device if the system did not initiate the connection (e.g., Caller ID data for a voice call, IP number or other unique identifier that is available when a data connection is established, by explicitly querying the user and/or client device for identifying information of a variety of types, etc.).

In addition, in some embodiments additional functionality is provided to allow a switch back to the original context after a user has completed a desired operation, such as in an automatic manner or based on a manual request. Alternatively, in some embodiments multiple connections of different types (e.g., each having a different session) may simultaneously be ongoing, and the multiple servers involved in those connections may continue to exchange context information (e.g., on a periodic basis, or after relevant interaction events have occurred via one or both of the connections) in order to maintain an ongoing synchronization or other correlation between the information exchanged via the multiple connections. When two or more servers interact to exchange context information, such interactions can also be performed in a direct manner between the servers, or may instead involve one or more intermediary devices (e.g., a controller or other high-level intermediary device).

Some embodiments of the software facility are described below in which specific techniques are disclosed for providing access to specific types of functionality in specific manners and in specific situations. However, those skilled in the art will appreciate that the techniques of the invention can be used in a wide variety of other situations, and that the invention is not limited to the specific details discussed. In addition, while many of the examples discuss interactions with voice and data servers, such as via voice and data connections established using voice and data modes of wireless phones, the invention is not limited to use with those types of servers, those types of connections, or those types of client device modes.

As an illustrative example of one use of the described software facility, consider the following example of accessing a UM system Voice Server and a wireless application system Data Server (e.g., a WAP-based server, or a server that supports other wireless access) from a wireless computing device. FIG. 1 illustrates an example network diagram in which such an example could occur, with a wireless phone client device 110 able to interact with a UM system Voice Server 180 directly via the public switched telephone network ("PSTN") 160 and a PBX 170 when using a voice mode connection with a voice path 135, and able to interact directly with a wireless application system Data Server 140 via a wireless switch 120 and data gateway 130 when using a data mode connection with a data path 125. The voice connection and data connection share an initial path 115 of voice and data information between the client device and the wireless switch in the illustrated embodiment, and messages are maintained in the illustrated embodiment in a message store 190 accessible to both the UM system and the wireless application system, although in other embodiments such messages may instead be stored directly by the wireless application system and/or the UM system.

The example begins with the user in a data session with the wireless application system on a wireless phone. Typically, the user would be reviewing messages in the message store via the mail data server 150, but other activities could also include selecting names from an address book (not shown) to set up an audio conference call and/or other such communications-related activities available from the wireless application system and/or the mail system.

The user then selects a function from a menu on the wireless phone display that makes use of a voice connection, such as one of the following: recording a voice reply to an email; listening to a voice message that was displayed in the message list on the wireless phone screen; recording a voice message that was addressed using the address book; listening to an email rendered in audio through text-to-speech conversion so that the users eyes and hands are free for other activities such as driving; or completing an audio conference set up using the wireless phone data application.

Next, the wireless application system communicates context data to the UM system about the current status of interactions of the user with the wireless application system. In this illustrative example, the communicated context data includes the following: the user's identity; the function requested (e.g., reply, listen, originate message, create conference, etc.); state information such as the ID of the message referenced for a reply; address information, such as the recipients of an originated message or conference call; preference information for the user (if available); and optionally other data specific to the function being performed.

Context data may be communicated in various ways, such as by direct communication 145a between the wireless application system and the UM system (e.g., via one or more data packets using a standard network protocol such as TCP/IP), by storing the context information in a location accessible to the UM system 145b (e.g., by posting a message 195 containing the context information through the mail server system into the user's account on the message store), etc. If context information is sent as part of a stored message, for example, the message may be stored in a special folder or otherwise identified with a unique attribute that identifies the message as containing context information.

After the context information is available to the UM system, a voice connection between the wireless phone and the UM system is automatically established, which can be performed in a variety of manners. For example, the wireless application system may send instructions to the wireless phone to place a call to the UM system, or alternatively the UM system may originate a call to the wireless phone (e.g., if the context data it received contained the phone number of the wireless phone or that phone number could otherwise be automatically accessed, such as based on the user's identity).

The UM system then determines the identity of the wireless phone with which it is communicating, such as by automatically identifying the telephone number of the wireless phone through the telephone network and the PBX if the call is initiated by the wireless phone. The phone number is then used to identify the caller, such as by accessing mapping information (e.g., a phone directory). In the absence of a calling number in situations when the call is initiated by the wireless phone, the user may instead be prompted to input the phone number or a UM mailbox number to identify himself.

The UM system accesses the context data from the wireless application system, which indicates that an outstanding request for a specified service exists for this user. This is accomplished by, for example, searching a table of outstanding requests and/or by searching the user's account on the message store. The UM system then places the user into the appropriate context to process the user's request. For example, in the case of a voice reply, the system immediately prompts the user to begin recording the reply (e.g., skipping any introductory menus or other information normally provided when a voice connection is first established).

Upon completion of the user's original request, the user's session on the UM system may persist, such as by the UM system reverting to its standard user interface—this would allow the user to take advantage of all the features of the UM system. Alternatively, in other embodiments the voice session could instead end after the request was satisfied, and could optionally have the client device revert back to the previous context in the data session with the wireless application system.

While specific details were provided in this example for the sake of clarify, various of the functionality described in the example can be performed in other ways, such as functionality for having a wireless computing device automatically switch between data mode and voice mode and for having the wireless computing device automatically initiate a new connection to the appropriate system to provide the desired functionality.

For example, when using a WAP-enabled wireless computing device, it is possible to use WAP functionality to tell a browser to drop a session. Thus, for example, when the user selects "Voice reply" functionality (e.g., by clicking on a corresponding link with an appropriate URL), the wireless computing device can be directed back to the wireless application system, which responds with a WML page that directs the wireless computing device to end the current data session and contact the UM system in a specified manner (e.g., by dialing a specified telephone number). After the wireless computing device receives the response WML page, it drops the current connection and initiates a voice connection to the UM system as instructed, such as automatically if the wireless device supports it (e.g., using such technology as Wireless Telephony Application Interfaces) or semi-manually by the user following steps outlined on the WML page.

After the UM system accepts the voice connection (e.g., answers the telephone call) and initiates a voice session, the UM system can provide functionality as appropriate, such as by retrieving the context information from the wireless application system and automatically directing the user into a voice reply functionality for the earlier-specified message. The UM system can also optionally provide various security features, such as by prompting the user for an appropriate PIN or other access information before providing the functionality. After the user has completed the voice reply, the UM system can then provide other appropriate functionality, such as by automatically directing the user to a main menu for the UM system.

In addition, other functionality described above in the example can also be performed in various ways, such as functionality for having context information shared between the wireless application system and the UM system. As mentioned above, in some embodiments the UM system and wireless application system will directly interact (e.g., via message passing) to exchange the information, while in other embodiments the information can be stored in a location accessible to both (e.g., in a special message that can be recognized by the system that will use the stored information). For example, the special message can be a hidden message in the user's UM mailbox, and can contain indications of the action to perform and the message to reply or listen to (e.g., by using an identifier for that message). If so, the existence of the special message can be identified by the UM system, and when found the stored information in that special message can be used to determine the appropriate functionality to provide.

The previous illustrative example described benefits provided when automatically switching from a data session via a data mode connection to a voice session via a voice mode connection. However, switching from a voice mode session to a data mode session also provides a variety of benefits. For example, a user may want to scan email using a voice interface that plays the email subject and sender information. Upon hearing a subject the user is interested in, the user can select to view the email in text form on his wireless phone. The UM system would then send appropriate context information to the wireless application system to register the request, and the session would be automatically switched from a voice mode connection to a data mode connection. The wireless application system would then display the selected message to the user via the data session. In some embodiments, the switch from voice mode to data mode may instead be manually performed by the user, such as based on prompting from the facility.

Figure 2:
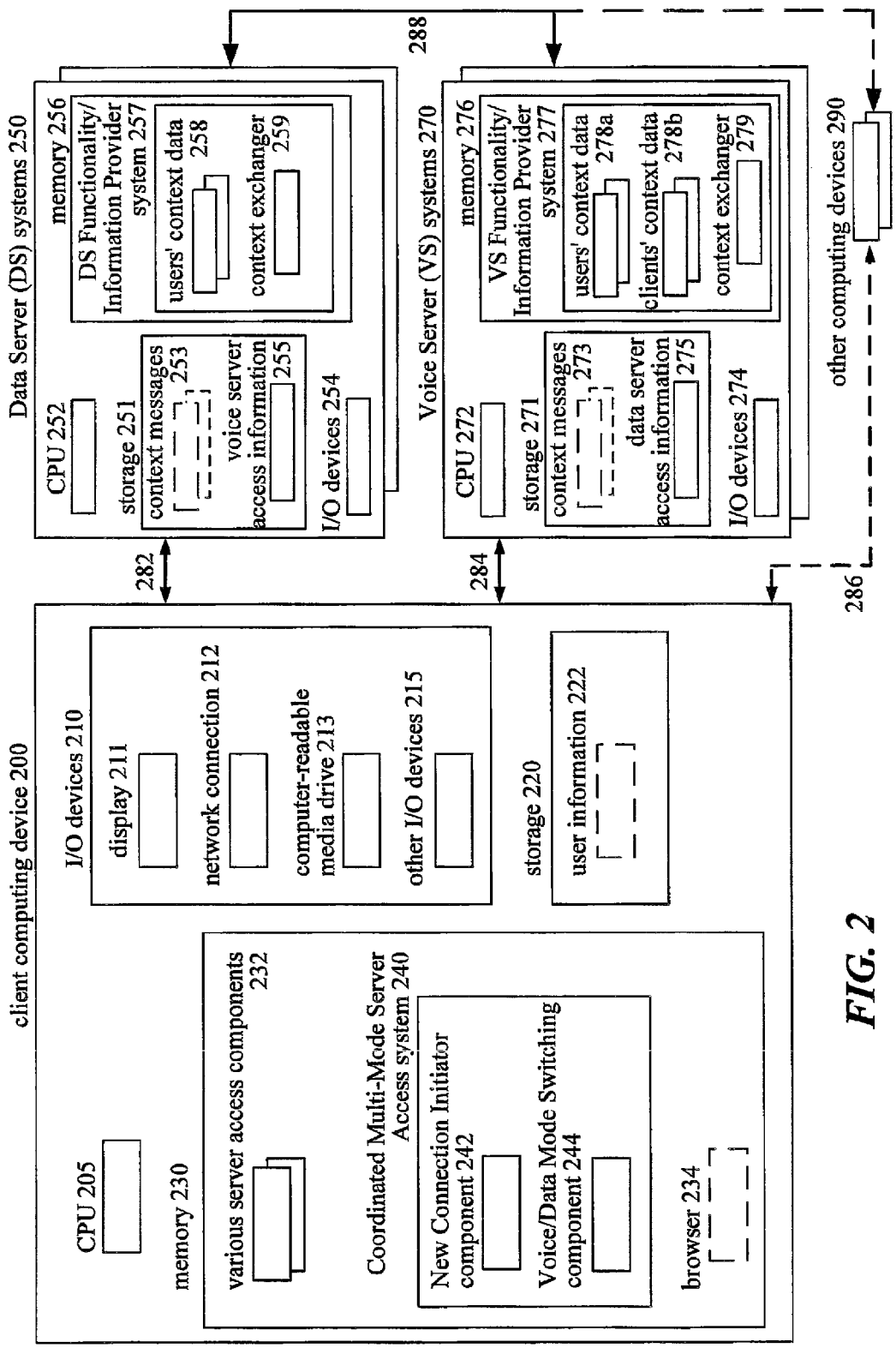
FIG. 2 is a block diagram illustrating a computing system suitable for executing an embodiment of the disclosed facility that assists in providing client computing devices with coordinated multi-mode access to stored information and/or associated functionality.

FIG. 2 illustrates a client computing device 200 that is interacting with one or more Data Server ("DS") systems 250 and one or more Voice Server ("VS") systems 270 in order to receive coordinated access to information and/or functionality of multiple types from multiple servers using multiple types of connections. The DS and VS systems also communicate with each other in order to exchange context information related to interactions of the systems with the client device.

The client computing device includes a CPU 205, various I/O devices 210, storage 220, and memory 230. The I/O devices include a display 211, one or more network connections 212 (e.g., a telephone dialer component for voice mode access when the client is a telephone, and a network driver for data mode access when the client supports data connections), a computer-readable media drive 213, and other I/O devices 215 (e.g., a numeric keypad, an alphanumeric keyboard, a touch-sensitive input screen, a stylus for writing, a microphone, a speaker, etc.). In other embodiments, the client computing device may not have all of the illustrated components and/or may have additional components. Mobile telephone client devices, for example, may include microphones and/or speakers to provide voice-related functionality, as well as other possible I/O devices.

An embodiment of a Coordinated Multi-Mode Server Access system 240 is executing in memory 230, and it includes a Voice/Data Mode Switching component 244 and a New Connection Initiator component 242. The illustrated client device also optionally includes a browser 234 executing in memory 230 (e.g., for accessing information and functionality from remote servers in a uniform manner), as well as one or more optional other components 232 executing in memory 230 to assist in accessing various servers (e.g., to provide specialized types of functionality access, such as by using proprietary software provided by those servers). One or more users of the client computing device can use to the device to access information from the DS and VS systems in a variety of ways. For example, users that have physical access to the client computing device may use some or all of the I/O devices 210 to specify and receive (e.g., view and/or hear) communications as well as to perform various other manipulations of stored information. Alternatively, other users may use other computing devices (not shown) to remotely access the client device and its functionality (e.g., via the Internet and/or the World Wide Web).

In the illustrated embodiment, the Coordinated Multi-Mode Server Access system interacts with Functionality/Information Provider ("FIP") systems 257 and 277 of the DS and VS systems, respectively, to enable the client device users to receive various information and functionality. For example, the Voice/Data Mode Switching component switches (e.g., automatically) the type of connection in use by the client and the New Connection Initiator component initiates a new specified connection, such as automatically in response to indications from one or more of the FIP systems. The various server access components 232 can also in some embodiments assist in providing various specific types of functionality (e.g., a voice reply to an email message, a new voice message to one or more recipients, viewing the contents of a message for which voice information has been provided, etc.), such as automatically in response to an indication from a FIP system or manually in response to an indication from a user. Other optional information and executing components may also be available for use, such as user information 222 on storage (e.g., user identification information, user preference information, etc.).

While in some embodiments all of the computing devices and systems may be networked together in such a manner that they can all communicate using a single network, in the illustrated embodiment the client device maintains distinct connections 282 to each of one or more DS systems (e.g., a data session over a data connection with each such DS system) and distinct connections 284 to each of one or more VS systems (e.g., a voice session over a voice connection with each such VS system). The client device may also optionally be in communication with one or more other computing devices 290, such as over a distinct connection 286.

The FIP system(s) 257 (executing in memory 256 of a DS system 250) and the FIP system(s) 277 (executing in memory 276 of a Vs system 270) similarly interact with the client device and other client devices (not shown) to provide various data-based and voice-based functionality, respectively. In addition, the FIP systems interact with each other and the Coordinated Multi-Mode Server Access system to provide coordinated multimode information and functionality to the client device. In the illustrated embodiment, the DS systems each also include a CPU 252, storage 251, and various I/O devices 254, and the VS systems similarly each include a CPU 272, storage 271, and various I/O devices 274. The systems may also each optionally be in communication with one or more of the other computing devices 290, such as via connection 288.

As each of the HP systems interact with a client device, such as based on interactions specified by a user of the client device, the FIP system maintains a set of context data (e.g., context data 258 for FIP system 257 and context data 278a and 278b for FIP system 277) for that user and/or that client device. Portions of that context information can then be provided to another FIP system to provide context that allows that other FIP system to provide coordinated functionality/information to users and/or client devices, with the exchange of that context information able to be performed in a variety of ways. For example, context information may be stored in a context message 253 or 273 in storage 251 or 271 of a destination system by a sending system, or the sending system may instead send the context information to the destination system via direct message passing, such as via a connection 288 between those systems. After a destination system receives such context information, it may be stored separately in an accessible location, or instead integrated into the context data 258 or 278 in memory.

The determination of when and how to exchange context information between VS and DS systems is facilitated by context exchanger components 259 and 279 of the FIP systems 257 and 277, respectively. In particular, a context exchanger component 259 of a DS system may access voice server access information 255 on storage 251 in order to determine what VS system to contact when voice-based functionality is requested by a client device and how to contact that VS system (e.g., an IP number), and may also optionally specify a manner in which destination systems desire to receive context information (e.g., as a stored message in an accessible location). In addition, the voice server access information may also optionally include information to allow the DS system to know when to exchange context information with another system, whether in response to functionality and/or information requested by a client device (e.g., by identifying the specific types of information and functionality that are to be provided by a VS system, such as with a predefined mapping between specific voice-based functionality/information requests or types of voice-based functionality/information requests and corresponding voice servers) or as part of an ongoing exchange of context information (e.g., a schedule or other indication or periodic times, or instead an indication of types of events at the system that would trigger an exchange of context information, such as specific types of interactions with a client device). The data server access information 275 on storage 271 of a VS system 270 allows the context exchanger component 279 of the VS system to perform an analogous determination of what DS system to contact when data-based functionality is requested by a client device and how to contact that DS system.

Those skilled in the art will appreciate that computing devices and systems 200, 250 and 270 are merely illustrative and are not intended to limit the scope of the present invention. The computing devices and systems may be connected to other devices that are not illustrated, including through one or more networks such as the Internet or via the World Wide Web (WWW). In addition, the functionality provided by the illustrated FIP system components and/or system 240 components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 3A:
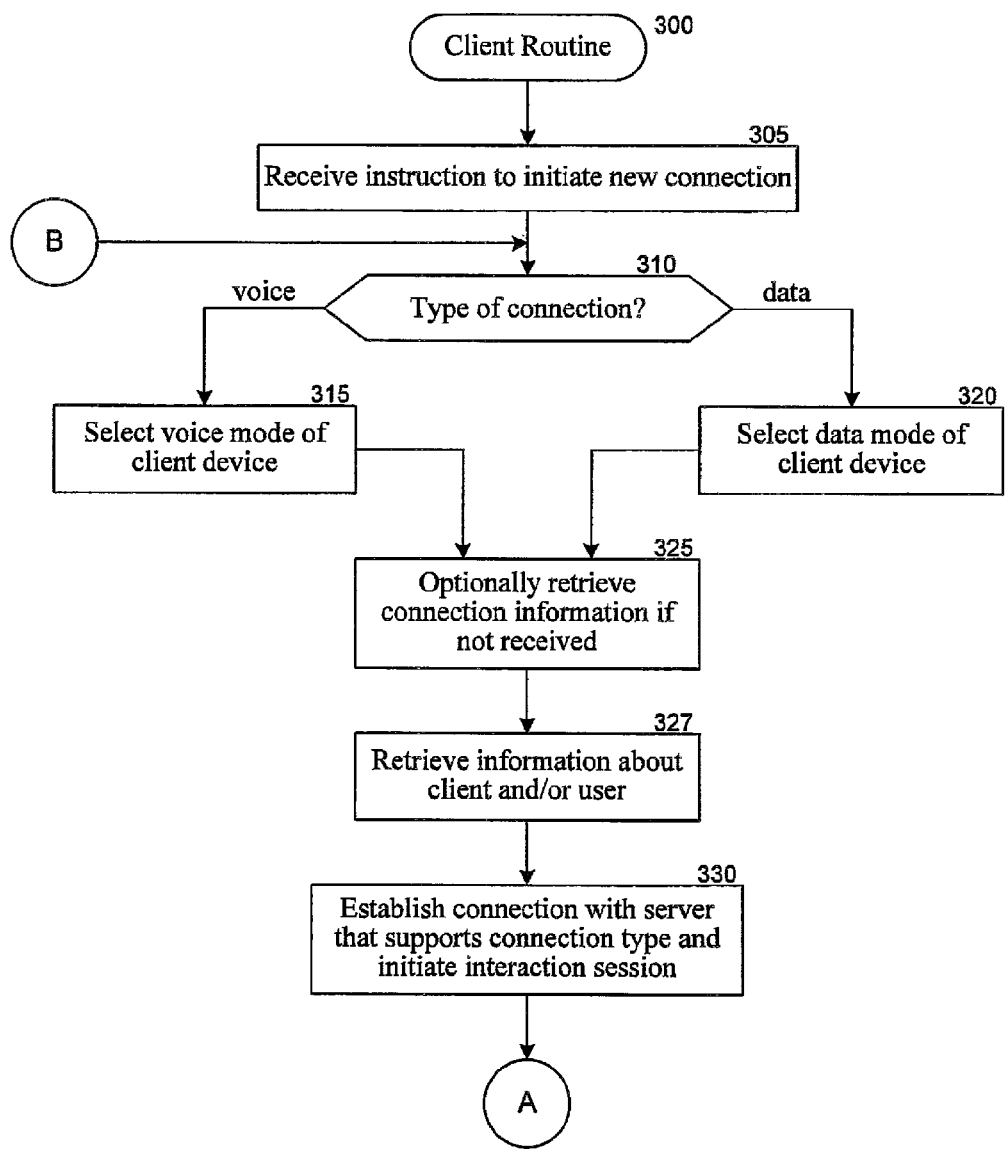
FIGS. 3A and 3B are a flow diagram of an embodiment of a routine performed by an example client device when participating in receiving coordinated multimode access to stored information and/or associated functionality.
Figure 3B:
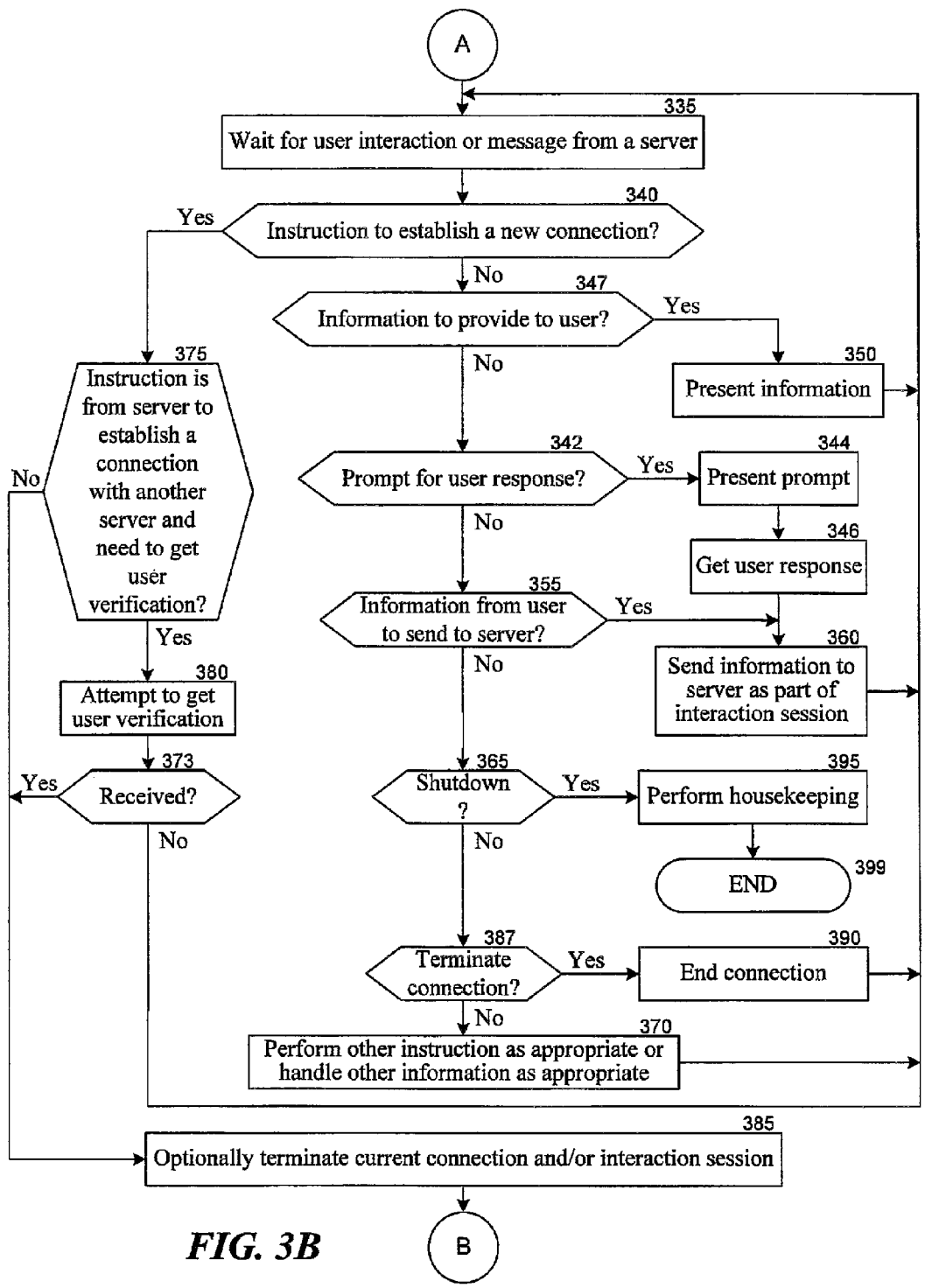

FIGS. 3A and 3B are a flow diagram of an embodiment of a routine performed by a client device when participating in receiving coordinated multi-mode access to stored information and/or associated functionality. The routine establishes connections with one or more servers in steps 305-330, and in steps 335-385 performs various interactions with one or more users of the client device and with multiple servers in receiving coordinated multi-mode access to stored information and/or associated functionality.

In particular, the client routine 300 begins at step 305, where an instruction is received to initiate a new connection to a specified remote server, such as an instruction from a user of the client device after startup, or instead automatically as part of a startup routine of the client device. The routine then continues to step 310 to determine the type of connection that is requested, such as based on a type of the specified server. In particular, in the illustrated embodiment the client device has both a voice mode and a data mode, with the voice mode supporting voice-based communications with one or more remote voice servers and with the data mode supporting various types of data-based communications with one or more remote data servers—in other embodiments, a client computing device may support additional types of interaction modes and/or may not include one or both of the illustrated types of modes.

In the illustrated embodiment, if it is determined in step 310 that the type of connection to be established is a voice-based connection, the routine continues to step 315 to select the voice mode of the client device for use in the connection to be established. Conversely, if it was instead determined in step 310 that the type of connection to be established is a data-based connection, the routine continues to step 320 to select the data mode of the client device for use with the new connection. After steps 315 or 320, the routine continues to step 325, where any necessary information to initiate the connection is retrieved, such as any connection information not received in step 305. The routine then continues to step 327 to retrieve any information about the client device and/or the current user that is relevant for the connection, such as password or other access information for the client and/or the user that is needed to establish the connection with the server, identifier information for the client and/or the user, etc.

After step 327, the routine continues to step 330 to establish a connection with the specified server using the selected mode of the client device, and to then initiate an ongoing interaction session with that server for exchanging data of the type supported by that client device mode in use. In some embodiments, different transmission protocols and/or other manners of communication will be used for different types of connections. In the illustrated embodiment, relevant information about the client and/or the user is provided to the remote server as part of the processing performed in step 330, such as information retrieved in step 327 (e.g., identification information for the client and/or the user).

After a connection and interaction session is established in step 330, the routine continues to step 335 to wait for information indicating an interaction initiated by a user or a message received from a server with which the client device has an established connection (in some embodiments, multiple connections may be maintained simultaneously). After receiving an indication of a user interaction or server message, the routine continues to step 340 to determine if an instruction was received to establish a new connection. Such an instruction could in the illustrated embodiment come explicitly from a user of the client device or instead could be an instruction received from a server as part of a message, whether from a server with whom an established connection exists or instead a new server requesting to establish such a connection.

If it is determined in step 340 that an instruction to establish a new connection was received, the routine continues to step 375 to determine whether the instruction was received from a server to establish a connection with another server (e.g., as part of a message received from a server with which an established connection already exists), and if so whether verification from a user of the client device is needed to allow the establishment of the connection (e.g., based on predefined user preferences and/or other criteria). In the illustrated embodiment, if user verification is determined to be needed, the routine continues to step 380 to attempt to obtain the necessary user verification. If it is determined in step 373 that the user verification was received, or if it was instead determined in 375 that such user verification was not needed, the routine continues to step 385 to optionally terminate one or more of the current connections and/or interaction sessions before establishing the new connection, such as if the client device does not support simultaneous connections, or instead in accordance with other criteria (e.g., predefined user preferences). After step 385, the routine returns to step 310. If it was instead determined in step 373 that appropriate user verification was not received, the routine instead returns to step 335.

If it was instead determined in step 340 that an instruction to establish a new connection was not received, the routine continues instead to step 347 to determine whether information was received from a server to be provided to a user, such as one or more document (e.g., email messages or Web pages), and if so the routine continues to step 350 to present the received information to the user as appropriate. If it was instead determined in step 347 that information was not received to be provided to the user, the routine continues to step 342 to determine whether an instruction was received from a server to prompt the user for a response in an indicated manner. If so, the routine continues to step 344 to present one or more prompts to the user as appropriate, and in step 346 retrieves response information from the user. The routine then continues to step 360 to send the information from the user to the server as part of the interaction session with that server.

It was instead determined in step 342 that an instruction to prompt the user for information was not received, the routine continues instead to step 355 to determine whether or not information was received from the user to be provided to the server, and if so the routine continues to step 360 to send the information from the user to the server as part of the interaction session with that server. If not, the routine continues instead to step 365 to determine whether an instruction was received from the user to end the one or more current connections and data sessions, and if so the routine continues to step 395 to perform any necessary administrative housekeeping (e.g., notifying servers with which connections exist of the termination) and then continues to step 399 and ends. If it was instead determined in step 365 that a user instruction to end was not received, the routine continues to step 387 to determine whether an instruction was received to terminate a specified one of the current connections, such as from the user or from the server with whom the connection is established. If so, the routine continues to step 390 to terminate the connection, and if not the step continues to step 370 to perform another received instruction as appropriate or to handle other received information as appropriate. After steps 350, 360, 370, or 390, the routine returns to step 335 to wait for another interaction with the user or a message from a remote server.

Figure 4A:
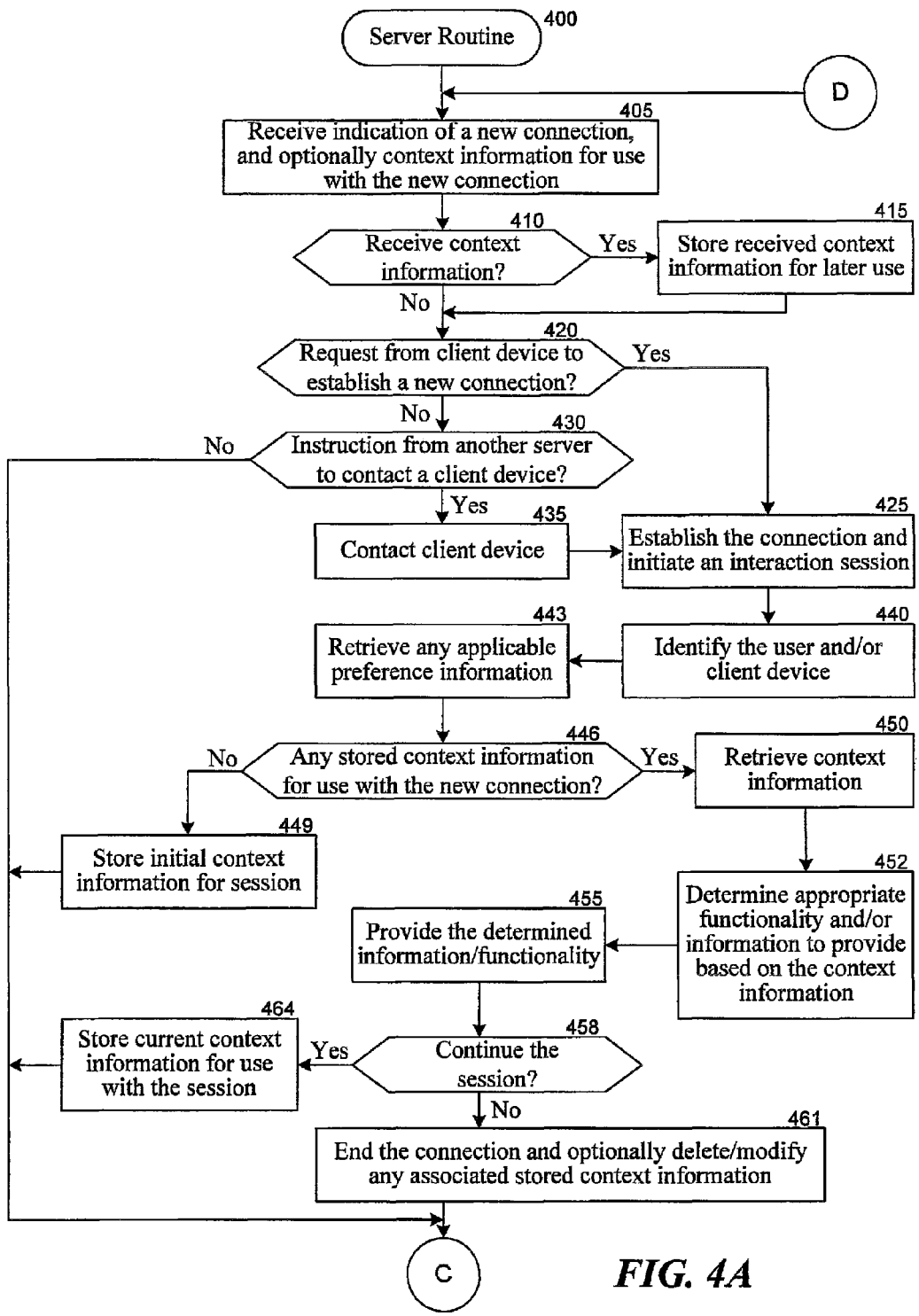
FIGS. 4A and 4B are a flow diagram of an embodiment of a routine performed by an example server system when participating in providing coordinated multimode access to stored information and/or associated functionality.
Figure 4B:
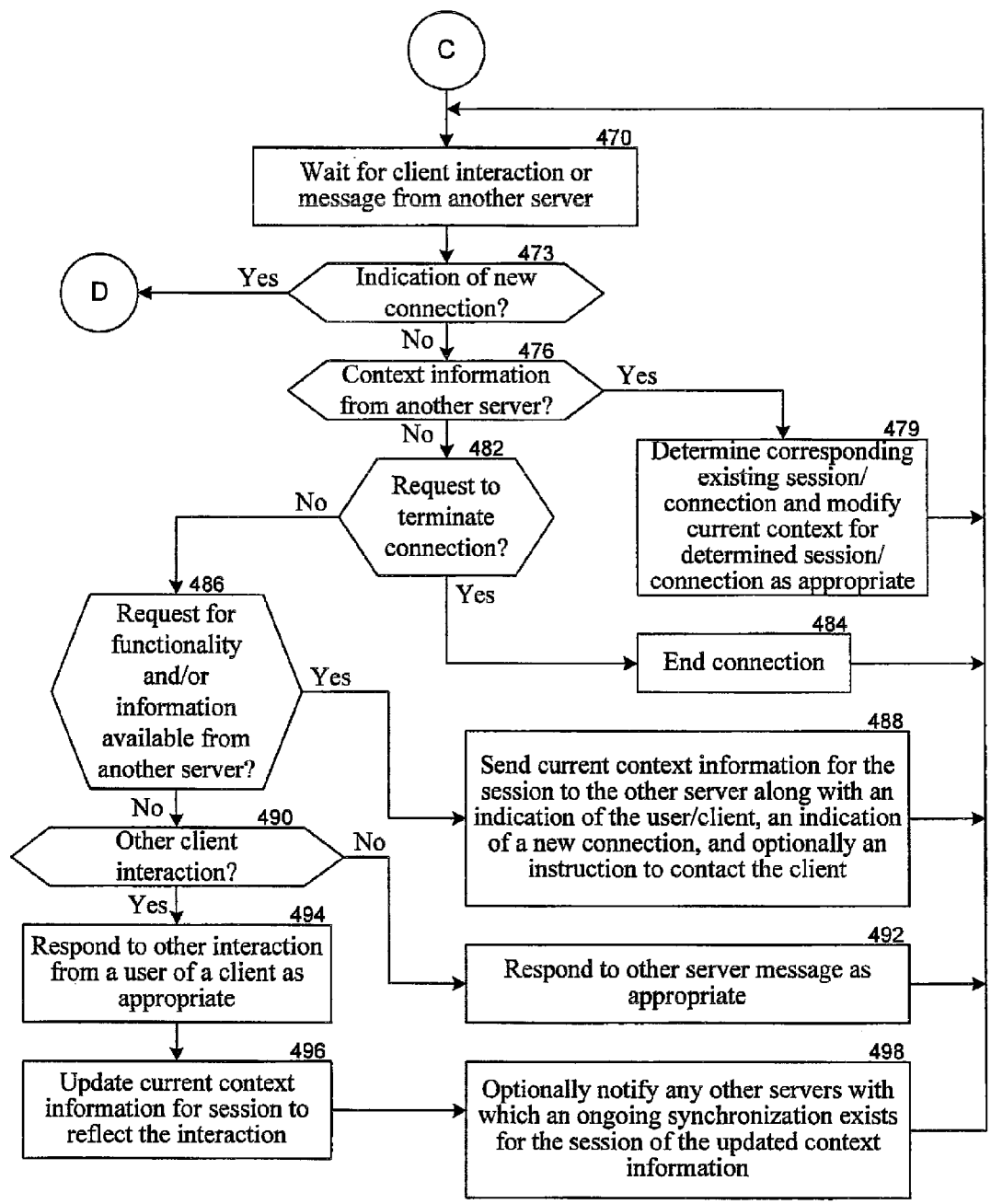

FIGS. 4A and 4B are a flow diagram of an embodiment of a routine performed by a server system when participating in receiving coordinated multi-mode access to stored information and/or associated functionality. In steps 405-425, the routine establishes a connection with a client device, and in steps 440-464 the routine optionally provides functionality and/or information to the client in an automatic manner based on context information for the client device and/or the user of the device. In steps 470-498, the routine performs a variety of other types of interactions with client devices and other server devices.

The server routine 400 begins at step 405, where an indication is received of a new connection with a client device, as well as optionally receiving context information for that client device and/or a user of the device to allow the server to automatically provide appropriate functionality and/or information after the new connection is established. The routine then continues to step 410 to determine whether any context information was received, and if so continues to step 415 to store that received context information for later use along with any received indication of the client device with which the new connection will be established and/or of the user of that device.

After step 415, or if it was determined in step 410 that no context information was received, the routine continues to step 420 to determine whether the indication received in step 405 was a request from a client device to establish a new connection, and if so the routine continues to step 425 to establish the connection and initiate an interaction session with the client device. If it was instead determined in step 420 that the received indication was not a request from a client device to establish a new connection, the routine continues to step 430 to determine whether the received indication in step 405 was an instruction from another server to contact the client device to establish a new connection, and if so the routine continues to step 435 to contact the client device in an appropriate manner, such as based on the type of server and/or any received indication of a manner of contact to the client device. If contact information for the client device was not received in step 405, the server may retrieve such information in a variety of ways, such as based on a pre-established relationship with that client device. After step 435, the routine continues to step 425.

After the connection is established in 425, the routine continues to step 440 to identify information about the client device and/or the user of the device, such as based on information received as part of the connection establishment or session initiation, or instead based on information received as part of the indication in step 405. The routine then continues to step 443 to retrieve any preference information for the user and/or the client device for use in interactions as part of the initiated session.

In step 446, the routine next determines whether any stored context information is available to affect how the server initially interacts with the client, whether such context information was received as part of the indication in step 405 and stored temporarily in step 415 until the connection was established, or is instead previously received context information that was stored in a manner associated with the client device and/or the user (e.g., associated with identification information for them). If no such stored context information is available, the routine continues to step 449 to generate initial context information for the session (e.g., a default initial context) and to store it for later use. However, if it was instead determined in step 446 that such stored context information is available, the routine continues to step 450 to retrieve the stored context information, and in step 452 determines appropriate functionality and/or information to provide to the client device and/or its user based on that context information. The routine then continues to step 455 to provide that determined functionality and/or information to the client device and its user, which may involve one or more interactions back and forth with the client device and/or its user (e.g., prompting the user of the client device for information, receiving the information from the user in response, and then performing an appropriate action on behalf of the user based on the received information).

After step 455, the routine continues to step 458 to determine whether to continue the established connection, such as based on the type of functionality and/or information provided, on information received as part of the indication in step 405, and/or on preference information retrieved in step 443. If the connection is not to be continued, the routine continues to step 461 to terminate the connection and to optionally delete or modify any stored context information that was retrieved in step 450 if it should not be used again for a later connection with the user and/or the client device. If it is instead determined in step 458 to continue the connection, however, the routine continues to step 464 to store context information for the interaction session based on the functionality and/or information that was provided. After steps 449, 461, or 464, or it was instead determined in step 430 that instruction was not received from another server to contact the client device, the routine continues to step 470 to wait to receive an indication of an interaction with a client device or a message from another server. In the illustrated embodiment, the server may be participating in ongoing interaction sessions with multiple distinct client devices, although in other embodiments only a single interaction session may instead be supported at a time.

After a client interaction or server message is received in step 470, the routine continues to step 473 to determine whether the client interaction or server message is an indication of a new connection that will be established, such as to provide functionality and/or information appropriate to context information that is also indicated. If so, the routine returns to step 405, but if not, the routine continues to step 476 to determine whether the information received in step 470 is context information received from another server, such as to maintain two or more connections (e.g., multiple connections between a single client device and/or user and multiple distinct servers, such as servers of different types) as synchronized or otherwise coordinated. If so, the routine continues to step 479 to determine a current established connection for the server that corresponds to the received context information, such as based on identification information received for the user and/or client device as part of message in step 470, and then modifies the current stored context information for that determined session or connection as appropriate to maintain a shared context. For example, if a user is interacting with another server and has modified the type of information that they are reviewing (e.g., a specific document), the current server may modify information displayed to the user of the client device and/or alter functionality available to the client device and its user to reflect the new information that the other server is providing to that user.

If it was instead determined in step 476 that context information from another server was not received, the routine continues instead to step 482 to determine whether a request was received to terminate the connection, such as from the client device with whom the connection exists. If so, the routine continues to step 484 to terminate the connection, but if not continues to step 486 to determine whether the request received in step 470 was from the client device for functionality and/or information that is available from another server.

For example, if the server is a voice server interacting with a client device using a voice mode, the user of the client device may request a text-based type of action or information related to the voice-based information being provided by the current server, or alternatively a user interacting with a data-based server (e.g., using a data mode of the client device) may request a voice-based type of action or information associated with the current information that they have received. If it is determined in step 486 that such functionality and/or information from another server is requested (whether explicitly by the user or implicitly based on a selection made by the user), the routine continues to step 488 to send current context information for the interactions with the client device and user to another server that can provide the requested functionality and/or information, along with an indication of the client device and/or user. In some embodiments or situations, the information sent to the other server may also include an indication that a new connection will be established, such as when the other server does not already have an established connection with the client device and/or user, and optionally could include an instruction for the other server to contact the client device and/or user to initiate establishment of the connection, such as along with appropriate contact information.

It was instead determined in step 486 that the request for functionality and/or information from another server was not received, the routine continues to step 490 to determine whether the indication received in step 470 was for another type of client interaction, and if so continues to step 494 to respond to another type of interaction from the client device over the established connection as appropriate, such as to provide requested information in the format and mode supported by the current connection and session with the client device. After step 494, the routine continues to step 496 to update the stored context information for the session to reflect the interactions with the client device and/or user, and in step 498 then optionally notifies any other relevant servers of the updated context information, such as any other servers that also have ongoing data sessions with the client and/or user and whose ongoing data sessions are synchronized or otherwise coordinated with the current session. If it was instead determined in step 490 that the indication received in step 470 was for another type of message from another server, the routines continues instead to step 492 to respond to the server message as appropriate. After steps 479, 484, 488, 492 or 498, the routine returns to step 470 to wait for another client interaction or message from another server.

Those skilled in the art will appreciate that in some embodiments the functionality discussed above may be provided in alternative ways, such as being split among more computing devices or consolidated into less computing devices. Similarly, in some embodiments more or less functionality than is described may be provided. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

We claim:

1. A method for computer-assisted accessing of information of multiple types via coordination of distinct information services, comprising:
    at a first client device having a coordinated multi-mode server access system executing in a memory of the first client device,
        determining a type of connection to be established with a first server computer;
        selecting a client device mode based on the type of connection determined;
        retrieving information about the first client device, a user of the first client device, or a combination thereof;
        utilizing the information retrieved and the client device mode selected to establish a first connection with the first server computer; and
        initiating an interaction session with the first server computer for exchanging data in the client device mode selected.

2. A method according to claim 1, further comprising:
    determining if a second connection is to be established with the first server computer or a second server compute in a different client device mode.

3. A method according to claim 1, further comprising:
    causing the first client device to switch from a first client device mode connection to a second client device mode connection.

4. A method according to claim 3, wherein switching from the first client device mode connection to the second client device mode connection is caused remotely by the first server computer or locally by the first client device or the user.

5. A method according to claim 3, wherein switching from the first client device mode connection to the second client device mode connection is performed automatically.

6. A method according to claim 3, wherein the first client device mode connection is a data-based connection and the second client device mode connection is a voice-based connection.

7. A method according to claim 3, wherein the first client device mode connection is a voice-based connection and the second client device mode connection is a data-based connection.

8. A method according to claim 1, wherein the coordinated multi-mode server access system comprises a voice mode and a data mode, wherein the voice mode supports voice-based communications with one or more voice servers, and wherein the data mode supports data-based communications with one or more data servers.

9. A computer program product comprising at least one non-transitory computer readable medium storing instructions translatable by at least one processor to perform:
    at a first client device, determining a type of connection to be established with a first server computer, wherein the first client device comprises a coordinated multi-mode server access system executing in a memory of the first client device;

selecting a client device mode based on the type of connection determined;

retrieving information about the first client device, a user of the first client device, or a combination thereof;

utilizing the information retrieved and the client device mode selected to establish a first connection with the first server computer; and initiating an interaction session with the first server computer for exchanging data in the client device mode selected.

10. A computer program product according to claim 9, wherein the instructions are further translatable by the at least one processor to perform:

determining if a second connection is to be established with the first server computer or a second server compute in a different client device mode.

11. A computer program product according to claim 9, wherein the instructions are further translatable by the at least one processor to perform:

causing the first client device to switch from a first client device mode connection to a second client device mode connection.

12. A computer program product according to claim 11, wherein switching from the first client device mode connection to the second client device mode connection is performed automatically.

13. A computer program product according to claim 11, wherein the first client device mode connection is a data-based connection and the second client device mode connection is a voice-based connection.

14. A computer program product according to claim 11, wherein the first client device mode connection is a voice-based connection and the second client device mode connection is a data-based connection.

15. A computer program product according to claim 9, wherein the coordinated multi-mode server access system comprises a voice mode and a data mode, wherein the voice mode supports voice-based communications with one or more voice servers, and wherein the data mode supports data-based communications with one or more data servers.

16. A computing device, comprising:

a memory;

a coordinated multi-mode server access system executing in the memory;

at least one processor; and at least one non-transitory computer readable medium storing instructions translatable by the at least one processor to perform:

determining a type of connection to be established with a first server computer;

selecting a client device mode based on the type of connection determined;

retrieving information about the first client device, a user of the first client device, or a combination thereof;

utilizing the information retrieved and the client device mode selected to establish a first connection with the first server computer; and initiating an interaction session with the first server computer for exchanging data in the client device mode selected.

17. A computing device according to claim 16, wherein the instructions are further translatable by the at least one processor to perform:

determining if a second connection is to be established with the first server computer or a second server compute in a different client device mode.

18. A computing device according to claim 16, wherein the instructions are further translatable by the at least one processor to perform:

causing the computing device to switch from a first client device mode connection to a second client device mode connection.

19. A computing device according to claim 18, wherein switching from the first client device mode connection to the second client device mode connection is performed automatically.

20. A computing device according to claim 16, wherein the coordinated multi-mode server access system comprises a voice mode and a data mode, wherein the voice mode supports voice-based communications with one or more voice servers, and wherein the data mode supports data-based communications with one or more data servers.

* * * * *